United States Patent [19]

Cavett et al.

[11] 3,813,488

[45] May 28, 1974

[54] VIDEO STRIPPER

[75] Inventors: John Dill Cavett, Pennsauken; Robert Sherman Hopkins, Jr., Hightstown, both of N.J.

[73] Assignee: RCA Corporation, New York, N.Y.

[22] Filed: Mar. 8, 1973

[21] Appl. No.: 339,192

[52] U.S. Cl. .......... 178/7.1, 178/DIG. 26, 179/2 TV
[51] Int. Cl. ....... H04n 5/16, H04n 5/38, H04n 7/18
[58] Field of Search ........ 178/7.1, DIG. 26, 7.3 DC, 178/7.5 DC; 179/2 TV

[56] References Cited

UNITED STATES PATENTS

| | | | |
|---|---|---|---|
| 3,315,033 | 4/1967 | Sennhenn et al. | 178/DIG. 26 |
| 3,463,940 | 8/1969 | Kaye et al. | 178/DIG. 26 |
| 3,527,886 | 9/1970 | Baur | 178/7.1 |
| 3,543,169 | 11/1970 | Hill | 178/DIG. 26 |
| 3,600,506 | 8/1971 | Richeson, Jr. | 178/7.1 |

*Primary Examiner*—Robert L. Richardson
*Attorney, Agent, or Firm*—Eugene M. Whitacre; Charles I. Brodsky

[57] ABSTRACT

This disclosure describes a circuit which is gated to amplify the video portion of a television signal to the exclusion of its synchronizing components, and which permits the amplitude adjusted, the gated signal to be adjsuted, yet without altering the value of its black level.

4 Claims, 1 Drawing Figure

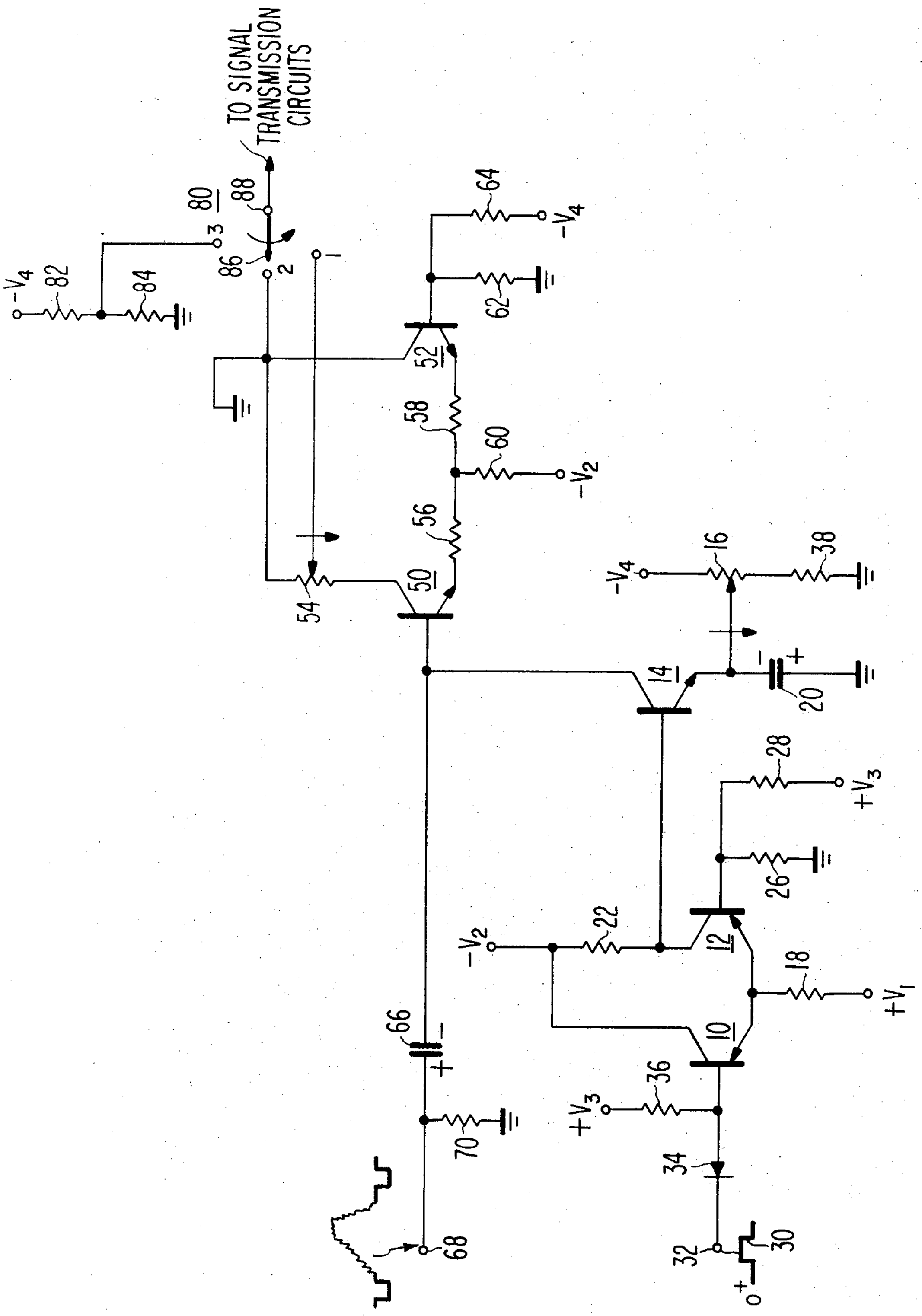
TO SIGNAL TRANSMISSION CIRCUITS

VIDEO STRIPPER

FIELD OF THE INVENTION

Pending U.S. Patent application Ser. No. 257,412, filed May 26, 1972, and entitled TELEPHONE IMAGE TRANSMISSION SYSTEM (RCA 64,997) describes a system which is capable of transmitting still television pictures of three-dimensional objects over communications channels such as long-distance unequalized voice-grade telephone lines. A television camera is therein employed to continually provide a video signal to a storage tube in which any one video frame of information can be "frozen". The single frame stored—i.e., the picture to be transmitted—is then converted to an audio frequency signal for transmission over telephone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

Such a transmission system has been termed "simplex", in that transmissions always travel in the same direction along the telephone link. In a "half-duplex" system, on the other hand, transmissions can proceed in either direction, but not simultaneously. As will be apparent, a telephone type communications line presents a rather harsh environment for such video signals, especially as its signal-to-noise ratio characteristic and its signal propagation rate limit available dynamic range. Because the system of the Ser. No. 257,412 application is concerned primarily with the transmission of video frame information, a savings in dynamic range can be effected by the elimination of the stored television synchronizing signals from the information actually communicated along the link. By eliminating these signals from the transmission, experimentation has shown that the total dynamic range for the video information can be increased some 20–30%.

SUMMARY OF THE INVENTION

As will become clear hereinafter, the circuit of the present invention employs a clamp and an amplifier to effectively reject the synchronizing components of the television signal while amplifying and passing its video components. A gain control potentiometer is incorporated in the amplifying portion to adjust the magnitude of the video signal which is applied to the communications link, and in a manner such that the black level of the signal will remain substantially constant. A three-position switch is further incorporated to permit observation of either the amplified video signal to be transmitted or of "black" and "white" reference voltage levels comparable to the black and white reference standards of the transmission system. Depending upon the correspondency which exists between the extremities of the amplified video signal with these reference levels, the video signal amplitude can be adjusted by the gain control in order to utilize the entire dynamic range capability of the transmission system. Maximum signal-to-noise ratio can thus be attained.

BRIEF DESCRIPTION OF THE DRAWING

These and other features will be more clearly understood from a consideration of the following description taken in connection with the accompanying drawing which shows a video stripping circuit according to the invention, employing a gain control potentiometer operative without altering the value of the black level which is passed.

DETAILED DESCRIPTION OF THE DRAWING

The clamp portion of the video stripper includes three transistors 10, 12 and 14 and a first potentiometer 16. As shown, the emitter electrodes of transistors 10 and 12 (PNP) are jointly coupled by a resistor 18 to a first source of operating potential $+V_1$ while the emitter electrode of transistor 14 (NPN) is coupled first, to the variable arm of potentiometer 16 and second, by an electrolytic capacitor 20 of the polarity indicated to a point of reference or ground potential. With the values indicated in the tabularization which follows, a resistor 22 couples the collector electrode of transistor 12 to a second source of operating potential $-V_2$, to which the collector electrode of transistor 10 is also connected. Whereas the base electrode of transistor 14 is directly connected to the collector electrode of transistor 12, the corresponding base electrode of transistor 12 is coupled by one resistor 26 to the reference potential point and by a second resistor 28 to a third source of operating potential $+V_3$. Positive-going drive signals 30 are applied at an input terminal 32 and are coupled by a semiconductor rectifier 34 to the remaining base electrode of transistor 10. Bias voltage is applied to that electrode from the $+V_3$ source of potential by means of a resistor 36, with the anode electrode of the rectifier 34 being connected to the end of resistor 36 which is remote from the $+V_3$ energizing source. Completing the clamp circuitry is a further resistor 38 which serially connects the potentiometer 16 between a fourth source of operating potential $-V_4$ and ground.

The amplifying portion of the circuit, on the other hand, is composed of two transistors 50 and 52, and a second potentiometer 54. As indicated, the emitter electrodes of the transistors 50, 52 (NPN) are connected by a pair of equal valued resistors 56, 58, to the junction of which the $-V_2$ potential source is coupled by a further resistor 60. Whereas the base electrode of transistor 50 is directly connected to the collector electrode of transistor 14, the corresponding base electrode of transistor 52 is coupled first, by a resistor 62 to the reference potential point and second, by a resistor 64 to the $-V_4$ source of operating potential. Also coupled to the base electrode of transistor 50 is one plate of a capacitor 66, as shown, the other plate of which is coupled to an input terminal 68 and to ground, the latter by way of a resistor 70. The amplifying portion of the video stripper is completed by a direct connection of the collector electrode of transistor 52 to the ground reference point and by the coupling of the second potentiometer 54 between the collector electrode of transistor 50 and that point. As further indicated, the variable arm of the potentiometer 54 is coupled to terminal 1 of a three-position switch 80, the other terminals being represented by the reference numerals 2 and 3.

In particular, the three-position switch 80 incorporates a pair of resistors 82, 84 which are serially coupled between the $-V_4$ potential source and ground. A movable contact 86 couples an output terminal 88 either to the video terminal 1, the reference potential, or black, terminal 2 or to the junction of resistors 82, 84, the white terminal 3. Output terminal 88 is in turn coupled to the signal transmission circuits which ultimately apply the video information signal to the audio communications link. As will be seen, the video signal applied at input terminal 68 comprises a negative-going composite signal composed of both video component information and synchronizing component information.

In operation, the horizontal drive pulses 30 are amplified and "level shifted" by PNP transistors 10 and 12, and are used to drive the NPN clamp transistor 14 into conduction. During this drive pulse interval, transistor 14 effectively couples the base electrode of NPN transistor 50 to the clamp level capacitor 20. Such capacitor will be seen to be continually charged to a potential which is, in turn, established by the setting of the variable arm on the clamp level control potentiometer 16. This causes the base electrode of transistor 50 to be connected to a low impedance source of adjustable negative voltage during each horizontal drive period of the input signal applied at terminal 68.

With transistor 10, 12 being of PNP variety and transistors 14, 50 and 52 being of NPN type, it will be noted that transistor 52 serves to establish a reference potential for the emitter electrode of transistor 50. With the potentiometer 16 adjusted so that the base electrode voltage of transistor 50 will be just at cutoff during the horizontal drive interval, it will also be noted that transistor 50 will conduct whenever the signal applied to its base electrode is more positive than the clamp voltage. The video signal will thus be seen to be amplified—to the exclusion of both the horizontal and vertical synchronizing components—with the amplitude of the signal developed at the variable arm of potentiometer 54 being dependent upon the setting selected. Because "black level" is represented by collector current cutoff of the transistor 50—and is represented by the collector supply voltage (in this case, zero volts)—adjustment of the variable arm of potentiometer 54 permits the video output signal applied to switch terminal 1 to be varied in amplitude, yet without altering in any manner, its black level.

As regards the three-position switch 80, it will be appreciated that the values selected for resistors 82 and 84 depend upon the maximum voltage which the telephone communications link can handle before significant noise problems are produced. In one embodiment of a communications system constructed in accordance with the Ser. No. 257,412 application, this value was of the order of −0.5 volts. This represents the white level and is present at terminal 3 of the switch 80. In order to obtain the maximum dynamic range from the telephone line employed, the video signal at switch terminal 1 can be observed on a cathode-ray oscilloscope, and adjustments made of the variable arm of potentiometer 54 until the maximum extremities of the video signal conform to the reference and −0.5 volt potentials respectively present at the black and white level terminals 2 and 3 of the switch. By observing the signal at the output terminal 88 when the arm 86 of the switch 80 is connected to switch terminal 1, proper potentiometer adjustment can be determined to ensure that the video signal characteristics correspond to the black and white reference standards for the transmission system. Terminal 88 then couples the video signal of correct amplitude and extremities to the remaining circuits for transmission along the audio link.

While applicant does not wish to be limited to any particular set of values, the following have proved useful in one embodiment of the invention:

| | |
|---|---|
| Resistor **18** | 1 kilohm |
| Resistor **22** | 10 kilohms |
| Resistor **26** | 3 kilohms |
| Resistor **28** | 3 kilohms |
| Resistor **36** | 3.3 kilohms |
| Resistor **38** | 2 kilohms |
| Resistor **56** | 120 ohms |
| Resistor **58** | 120 ohms |
| Resistor **60** | 1.5 kilohms |
| Resistor **62** | 2 kilohms |
| Resistor **64** | 820 ohms |
| Resistor **70** | 75 ohms |
| Resistor **82** | 2.4 kilohms |
| Resistor **84** | 220 ohms |
| Capacitor **20** | 4.7 microfarads |
| Capacitor **66** | 0.1 microfarads |
| Transistor **10** | 2N3638A Type |
| Transistor **12** | 2N3638A Type |
| Transistor **14** | 40361 Type |
| Transistor **50** | 2N3643 Type |
| Transistor **52** | 2N3643 Type |
| Rectifier **34** | 1N914 Type |
| Potentiometer **16** | 0–500 ohms |
| Potentiometer **54** | 0–500 ohms |
| Potential Source $+V_1$ | +15 volts |
| Potential Source $-V_2$ | −15 volts |
| Potential Source $+V_3$ | +6 volts |
| Potential Source $-V_4$ | −6 volts |

Whereas there has been described what is considered to be a preferred embodiment of the present invention, it will be readily apparent to those skilled in the art that other modifications may be made without departing from the scope of the teachings herein.

It will also be readily apparent that correct reproduction of the image content transmission requires some subsequent re-insertion of the synchronizing information deleted from the transmission. One simple way of accomplishing this is to precede the image sending by a control signal, accurately timed with respect to the start of the transmission, to trigger oscillation apparatus at the receiver location arranged to precisely regulate both the scanning of the electron beam at its storage tube and at its kinescope so that synchronized deflection and retrace blanking is maintained. With a highly stable clocking source, for example, little improvement in operating characteristics would result from the application, instead, of a continuously occurring synchronizing signal otherwise transmitted along with the desired information content.

What is claimed is:

1. In a television image transmission system of the type wherein an audio communications link having limited available dynamic range is employed to transmit a particular frame of television information to a remote receiver location and wherein said information typically includes video signal components and synchronizing signal components, the combination therewith of:

first means adapted to receive and amplify said video and synchronizing signal components;

second means to de-activate said first means during the synchronizing signal component interval of said frame of television information, whereby substantially only the video signal components thereof are amplified;

third means for deriving amplified output signals from said first means, said third means including a variable impedance for adjusting the amplitude of the output signal derived, but referenced to a direct current level of substantially fixed magnitude corresponding to the signal level derived by said third means during said synchronizing signal component interval when said first means is de-activated; and fourth means for coupling said output signal to said audio communications link for transmission to said remote receiver location.

2. The combination of claim 1 wherein said third means derives an amplified output signal of adjustable amplitude referenced to a substantially zero volt direct current level.

3. The combination of claim 2 wherein said audio communications link is characterized by the ability to couple an applied signal of predetermined magnitude into the transmission path and wherein said third means derives an output signal of an amplitude which is adjustable to the extent of such predetermined magnitude.

4. The combination of claim 3 wherein said variable impedance includes a potentiometer device.

* * * * *

UNITED STATES PATENT OFFICE
CERTIFICATE OF CORRECTION

Patent No. 3,813,488 Dated May 28, 1974

Inventor(s) John Dill Cavett et al.

It is certified that error appears in the above-identified patent and that said Letters Patent are hereby corrected as shown below:

On the title page, under "References Cited", that portion reading "Baur" should read -- Baun --.

In the Abstract, lines 4-5, that portion reading "permits the amplitude adjusted, the gated signal to be adjsuted" should read -- permits the amplitude of the gated signal to be adjusted --.

Signed and sealed this 1st day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334